US012138711B2

(12) United States Patent
Lacour

(10) Patent No.: US 12,138,711 B2
(45) Date of Patent: Nov. 12, 2024

(54) METHOD FOR THE LACQUER-REMOVING LASER MACHINING OF A PAINTED WORKPIECE

(71) Applicant: Marelli Automotive Lighting Reutlingen (Germany) GmbH, Reutlingen (DE)

(72) Inventor: Thomas Lacour, Tübingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 330 days.

(21) Appl. No.: 17/296,037

(22) PCT Filed: Nov. 21, 2019

(86) PCT No.: PCT/EP2019/082114
§ 371 (c)(1),
(2) Date: May 21, 2021

(87) PCT Pub. No.: WO2020/104599
PCT Pub. Date: May 28, 2020

(65) Prior Publication Data
US 2022/0009037 A1    Jan. 13, 2022

(30) Foreign Application Priority Data
Nov. 21, 2018 (DE) ............... 10 2018 129 329.1

(51) Int. Cl.
*B23K 26/402*   (2014.01)
*B23K 26/03*    (2006.01)
*B23K 103/00*   (2006.01)

(52) U.S. Cl.
CPC .......... *B23K 26/402* (2013.01); *B23K 26/032* (2013.01); *B23K 2103/42* (2018.08)

(58) Field of Classification Search
CPC ............... B23K 26/402; B23K 26/032; B23K 2103/42; B23K 2103/172; B23K 26/0624; B23K 26/36; B44C 1/228
See application file for complete search history.

(56) References Cited

U.S. PATENT DOCUMENTS 5,571,430 A * 11/1996 Kawasaki ............ B23K 26/082
                                                    359/220.1
5,767,479 A    6/1998 Kanaoka
(Continued)

FOREIGN PATENT DOCUMENTS

CN    103889640 A    6/2014
CN    207656076 U    7/2018
(Continued)

OTHER PUBLICATIONS

International Search Report and Written Opinion of the International Searching Authority for PCT International Application No. PCT/EP2019/082114 mailed Feb. 21, 2020.
(Continued)

*Primary Examiner* — Vy T Nguyen
(74) *Attorney, Agent, or Firm* — Howard & Howard Attorneys PLLC

(57) ABSTRACT

A method for the material-removing laser machining of a workpiece, comprising a substrate element made from a plastic with a surface, and a lacquer coating applied to the surface prior to the laser machining, wherein the lacquer coating can be removed from a workpiece with a three-dimensional extent in a large-area region of the surface.

12 Claims, 4 Drawing Sheets

(56) References Cited

U.S. PATENT DOCUMENTS

| | | | |
|---|---|---|---|
| 5,817,243 A | 10/1998 | Shaffer | |
| 2007/0281247 A1 | 12/2007 | Phillips et al. | |
| 2013/0140649 A1* | 6/2013 | Rogers | H01L 29/0669 |
| | | | 438/48 |
| 2013/0160792 A1* | 6/2013 | Xue | B08B 7/0042 |
| | | | 134/1 |
| 2014/0131922 A1* | 5/2014 | Hildebrand | B23K 26/0884 |
| | | | 425/150 |
| 2014/0375794 A1 | 12/2014 | Singh | |
| 2016/0279737 A1* | 9/2016 | Strach | B23K 26/382 |
| 2018/0284330 A1* | 10/2018 | Parker | G02B 5/286 |
| 2019/0351504 A1 | 11/2019 | Reisacher et al. | |
| 2021/0331273 A1* | 10/2021 | Finn | B23K 26/0624 |

FOREIGN PATENT DOCUMENTS

| | | | | |
|---|---|---|---|---|
| DE | 19506768 A1 | 8/1995 | | |
| DE | 112007001312 T5 | 5/2009 | | |
| DE | 102011078825 A1 | 1/2013 | | |
| DE | 102012204715 A1 * | 1/2013 | ........... | B23K 26/362 |
| DE | 102016225602 B3 | 5/2018 | | |
| EP | 1279460 A1 | 1/2003 | | |
| WO | 2007142788 A2 | 12/2007 | | |

OTHER PUBLICATIONS

First Office Action dated Aug. 24, 2022 for Chinese Patent Application No. 201980084424.1.

Examination Report for European Patent Application No. 19809042.5 dated Nov. 8, 2023.

* cited by examiner

METHOD FOR THE LACQUER-REMOVING LASER MACHINING OF A PAINTED WORKPIECE

CROSS-REFERENCE TO RELATED APPLICATIONS

The present application is a National Stage of International Patent Application No. PCT/EP2019/082114, filed on Nov. 21, 2019, which claims priority to and all the benefits of German Patent Application No. 10 2018 129 329.1, filed on Nov. 21, 2018.

BACKGROUND OF THE INVENTION

1. Field of the Invention

The invention relates to a method for the lacquer-removing laser machining of a painted workpiece, comprising a substrate element made from a plastic with a surface, and a lacquer coating applied to the surface prior to the laser machining. The laser machining is carried out by a laser machining device which comprises a laser unit and a control unit for controlling the laser unit. The method comprises: arranging the painted workpiece in a machining position in a work region of the laser unit, generating values for operating parameters for operating the laser unit, generating and emitting a laser beam by the laser unit according to the generated values for the operating parameters, applying the emitted laser beam to the painted workpiece arranged in the machining position at a machining point in the region of the surface of the painted workpiece provided with the lacquer coating, so that material of the lacquer coating is removed locally at the machining point, and moving the laser beam and thus also the machining point according to the generated values for the operating parameters by the laser unit relative to the painted workpiece along a work path in the region of the surface of the painted workpiece provided with the lacquer coating, so that material of the lacquer coating is removed along the work path.

The invention further relates to a laser machining device and a computer program.

The plastic of the substrate element can be transparent. It should also be laser-resistant (without reflections). The laser machining of a workpiece that generally removes material is also called laser ablation or laser evaporation. In this case, material is removed from the surface by bombarding a surface coated with a material with pulsed laser radiation. The laser radiation used for this purpose has a high power density and leads to rapid heating of the material and the formation of a plasma on the surface. With laser pulses in the nanosecond range, the energy of the laser leads to a heating of the surface (in the sense of thermal movements of the atoms) during the laser pulse. Since the heat conduction allows only a slow energy transport into the volume, the irradiated energy is concentrated on a very thin layer (approximately 1 µm at a pulse length of 10 ns), so that the material irradiated with the laser reaches very high temperatures, resulting in a sudden evaporation of the material. Ionization (thermally, by laser light or electron impact) creates a plasma of electrons and ions of the removed material at a high power density of the laser.

In the context of the present invention, the painted workpiece from which the lacquer is to be removed comprises a substrate element made from a plastic with a surface, and a lacquer coating applied to the surface prior to the laser machining. The plastic of the substrate element is preferably transparent.

The workpiece is, for example, a painted decorative element or a painted decorative screen for a motor vehicle lighting device. The interior of a headlight is, for example, lined with such decorative screens (e.g., around a projection lens of a PES module or around a reflector edge of a reflection module) in order to shield the usually unsightly mechanics and electronics of the headlight located behind from views from outside through the transparent cover glass. For various reasons, for example, design aspects, it can be desirable to restore the transparency of the substrate element at least in selected regions. For example, it would be conceivable to arrange a motor vehicle light behind a transparent section of the painted decorative screen, which then emits light through the transparent section of the painted decorative screen in order to realize a lighting function. It would also be easily conceivable that a light source is positioned behind the painted decorative screen, which illuminates the region behind the painted decorative screen, so that the transparent portions of the painted decorative screen shine in order to realize a specific night design of the lighting device.

2. Description of the Related Art

From U.S. Pat. No. 5,817,243, a method is already known for removing material from different types of workpieces (e.g., metal, plastic, or leather), thereby introducing a best possible high-contrast design or pattern into the surface of the plastic part. If the workpiece is a coated workpiece and part of the coating is removed as part of the laser removal, it will be described only in connection with a coated metal part. If the workpiece is a transparent workpiece (for example, a cover glass of a motorcycle headlight), it will only be described that a pattern can be introduced into the transparent material of the workpiece by the laser. Furthermore, it will be described at various points that the method is supposed to produce a particularly detailed, filigree pattern on the workpiece.

SUMMARY OF THE INVENTION

The known method is therefore unsuitable for removing material of the lacquer coating from larger surfaces of a transparent plastic part provided with a lacquer coating. In addition, the described method is not suitable for plastic parts that have a complex three-dimensional shape.

Therefore, the problem addressed by the present invention is that of designing and developing a method of the initially described type such that material of the lacquer coating can be removed in a large-area region even in the case of a complex three-dimensional painted plastic part.

For solving this problem, the invention proposes a method wherein the machining point at which the laser beam impinges on the surface of the painted plastic part to be machined is moved back and forth along a plurality of adjacent work paths, wherein adjacent work paths are so close to one another that a machining point of the laser beam on one work path adjoins or partially overlaps a machining point of the laser beam on an adjacent work path in order to remove material of the lacquer coating over a large region. In addition, the laser unit is moved in accordance with the generated values for the operating parameters in order to change the position of the machining point and to follow a three-dimensional course of the surface provided with the lacquer coating when said laser unit moves along the work paths.

The machining point of the laser beam is moved along a plurality of adjacent meandering work paths, so that the material of the lacquer coating can be removed over a large region in the desired regions on the surface of the workpiece. An angle at which the laser beam impinges on the surface of the workpiece is preferably kept constant or small while the machining point of the laser beam moves along the meandering work paths. In the case of a three-dimensional course of the surface viewed in a global coordinate system, a constant adaptation of the beam direction in a global coordinate system is thus necessary. The variation of the direction of the laser beam can be achieved by varying the exit direction of the laser beam from the laser (for example, by using adjustable deflecting mirrors). However, it is also conceivable for the position and alignment of the entire laser unit to be varied, wherein the exit direction of the laser beam from the laser unit remains constant. In this case, the position and alignment of the laser unit follows the three-dimensional course of the surface provided with the lacquer coating, so that the laser beam always impinges on the surface at a constant angle. Using a scanner causes the angle to vary slightly.

In this case, it is conceivable that either the entire laser unit or only part of the laser unit is moved. In particular, it is conceivable that a part of the laser unit, which comprises a laser medium and a resonator, is not moved. Moving the laser unit or a part thereof comprises, in particular, a linear movement in an X-, Y- and/or Z-direction. Furthermore, moving the laser unit or a part thereof can also comprise a rotation about one or more of said X-, Y- and/or Z-axes.

The entire laser unit is preferably moved in position and alignment, while following the complex three-dimensional course of the surface of the workpiece. The laser unit is moved depending on the generated values for the operating parameters for operating the laser unit. The operating parameters therefore comprise, for example, a position (X, Y, Z), an alignment, and an adjustment speed of the laser unit. Furthermore, the operating parameters can in particular comprise a pulse duration, a pulse frequency, and a power of the laser beam or the laser unit. In particular, it is conceivable that pulse duration, pulse frequency and power of the laser unit are adjusted to constant values during the actual laser machining. In this case, power, pulse duration and pulse frequency must be adjusted as precisely as possible, so that the lacquer coating is removed as completely as possible in the desired layer thickness without damaging the substrate layer. In particular, the incomplete transparency of the substrate layer should not be impaired by the impinging laser beam.

The method according to the invention thus allows for a large-area and precise material removal in that the laser unit follows a three-dimensional course of the surface of the workpiece provided with the lacquer coating when it moves along the meandering work paths.

In one embodiment, the values for the operating parameters for operating the laser unit are generated and the laser unit is moved according to the generated values for the operating parameters such that an angle of the laser beam in the machining point relative to the surface of the workpiece provided with the lacquer coating remains constant while the laser unit moves along the work paths.

In an advantageous development of the invention, the machining point of the laser beam is moved by actuators on the surface of the plastic part provided with the lacquer coating. The actuators can be designed to move the laser unit or only part of it. The entire laser unit generating the laser beam may be moved by the actuators. However, it can prove advantageous if only part of the laser unit is moved by the actuators in order to change the position of the machining point. The laser unit comprises, for example, suitable deflectors (for example, adjustable deflecting mirrors) which are moved by the actuators, so that the exit direction of the laser beam from the laser unit can be varied. The actuators are, for example, electromagnetic actuators that are designed to move the laser unit or part of the laser unit in the X-, Y-, Z-directions and/or rotate the laser unit or part of the laser unit about one of said axes (X, Y, Z).

The actuators are advantageously controlled by the control unit for moving the laser unit or a part thereof. The controlling takes place in particular in accordance with generated values for operating parameters for operating the laser unit. In particular, the controlling takes place according to generated values for the position (X, Y, Z), the alignment, and the adjustment speed.

In the context of the present invention, the generating of values for the operating parameters comprises both a generating of the values immediately prior to or during the laser machining and a simple reading in of previously stored values. The values for the operating parameters of the laser unit are advantageously generated immediately prior to or during the laser machining, for example, from control loops. It is conceivable that the values for the operating parameters are generated automatically by the control unit, for example, depending on sensor signals which provide information about the exact three-dimensional course of the surface.

In a further advantageous embodiment of the invention, the values for the operating parameters of the laser unit are generated immediately prior to or during the actual laser machining in that values for the operating parameters generated and stored temporally prior to the laser machining are loaded into the control unit for the respective specific application.

The values for the operating parameters are advantageously generated depending on data of the workpiece (e.g., material of the substrate element and the lacquer coating, thickness of the substrate element and the lacquer coating). The data of the workpiece are entered, for example, manually by a user. However, alternatively or additionally hereto, it is also conceivable that the data of the workpiece are transferred to the control unit in the form of electronically stored values. In particular, data for different workpieces are stored and the data for the workpiece to be machined are selected and loaded into the control unit, so that the laser unit is operated in this way depending on data of the workpiece.

The values for the operating parameters are advantageously generated depending on information about the three-dimensional shape of the workpiece and/or about the machining position of the workpiece and/or information about a region of the lacquer coating to be removed and/or about the composition and/or thickness of the lacquer coating and/or about material of the substrate element. The laser unit is operated in a manner adapted to the workpiece to be machined depending on not comprehensively listed information about the workpiece.

In an advantageous development of the method, it has proven advantageous that the machining position, in particular a position and/or alignment of the workpiece, is detected by a sensor element and the values for the operating parameters are generated depending on the detected position and/or alignment. The laser unit is operated in this way depending on the position and/or alignment of the workpiece detected by the sensor element. In one embodiment, the sensor element can be used to detect whether the workpiece is located in the machining position and, in the event that the workpiece is located in the machining position, the laser unit can be controlled to emit a laser beam. In addition, a distance, for example, between the workpiece and the laser unit can be detected with the sensor element and the power of the laser unit can be adjusted to the detected distance from the workpiece. The sensor element comprises, for example, an optical sensor, in particular a camera or a light barrier, or a tactile contact sensor. Said sensor can be arranged, e.g., at the machining position and detect the position and alignment of the workpiece.

The laser unit is advantageously controlled depending on a computer program that can be executed on the control unit. The computer program is programmed so that the control unit executes or controls the method according to the invention when the computer program is processed on the control unit. In this way, at least the actual laser machining of the workpiece can take place in an automated manner within the scope of the method according to the invention. It is also conceivable that the generating of operating parameters takes place automatically as part of the processing of the computer program.

As a further solution of the problem, a laser machining device for the material-removing laser machining of a workpiece is proposed which comprises a substrate element made from a plastic with a surface, and a lacquer coating applied to the surface prior to the laser machining, wherein the laser machining device comprises a laser unit for generating and emitting a laser beam and a control unit for controlling the laser unit, and the laser machining device can carry out a method according to the invention.

The control unit advantageously comprises a computing unit and a computer program that can be executed on the computing unit. The computer program is preferably programmed to enable the control unit to control the laser unit. Furthermore, the computer program is preferably programmed to allow for an automated execution of the method according to the invention.

The control unit is advantageously designed to generate values for operating parameters of the laser unit. The values are preferably generated depending on data of the workpiece to be machined.

The laser machining device advantageously comprises actuators for positioning and/or aligning and/or moving the laser unit. In particular, the actuators allow for the laser unit to be moved in the X-, Y-, Z-directions and/or for the laser unit to be rotated about one of said axes (X, Y, Z).

The laser machining device advantageously comprises at least one sensor element for detecting a position and/or an alignment of the workpiece.

As yet a further solution of the problem, a computer program is proposed which is programmed to carry out the method according to the invention when it runs on a computing unit belonging to a control unit of a laser machining device that is used for the material-removing laser machining.

BRIEF DESCRIPTION OF THE DRAWINGS

Further features and advantages of the invention will become apparent from the following description in which preferred embodiments of the invention are explained in more detail using the drawings, in which.

DETAILED DESCRIPTION OF THE INVENTION

Figure 1:
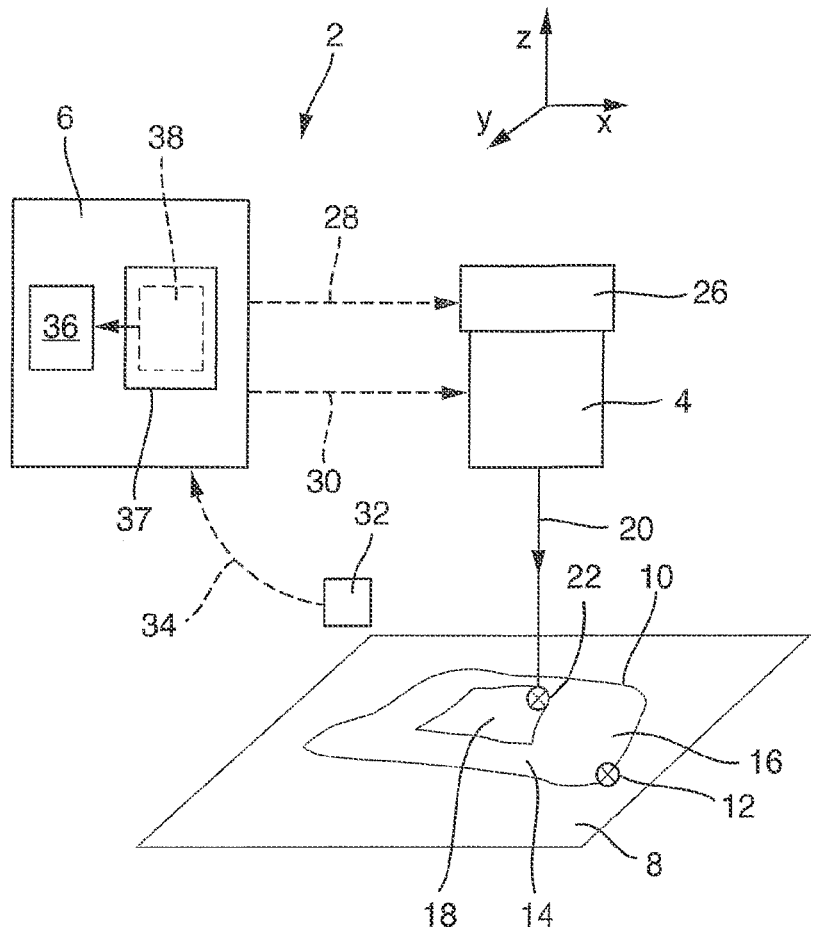
FIG. 1 shows a laser machining device according to the invention.

FIG. 1 shows a laser machining device for the material-removing laser machining of a workpiece. The laser machining device in its entirety is denoted with reference sign 2. The laser machining device 2 comprises a laser unit 4 and a control unit 6 for controlling the laser unit 4. The laser unit 4 consists of a laser light source, a 2D scanner unit and a focusing unit and is designed to generate and emit a laser beam.

For generating laser beams, the laser unit 4 can in principle comprise, for example, a semiconductor laser, a gas laser, or a solid-state laser. It preferably comprises a solid-state laser. The solid-state laser is not depicted separately. For example, the solid-state laser is a fiber laser.

In a fiber laser, laser radiation is conducted through a fiber with a doped fiber core and amplified at a resonator. Fiber lasers are generally pumped optically by coupling radiation from lasers, in particular diode lasers, parallel to the fiber core in its cladding or in the fiber core itself. Known doping elements for the laser-active fiber core are erbium, ytterbium, and neodymium. After exiting the active fiber, the laser beam usually enters a glass fiber or an optical fiber cable containing such a glass fiber, wherein the glass fiber conducts the radiation, for example, to an optical element for focusing the laser beam.

In the present invention, the optical element is also not depicted but it is preferably arranged in the laser unit 4. The optical element is, for example, a lens. According to the depicted embodiment, a bundled laser beam thus emerges from the laser unit 4.

A workpiece 10 is arranged in a machining position 12 in a work region 8 of the laser unit 4. The workpiece 10 can be arranged, for example, manually in the machining position 12. As part of an automated sequence of the method, however, it is also conceivable to move the workpiece 10 into the machining position 12 by a pick-and-place robot and to deposit it there in a desired position and alignment.

Figure 5:
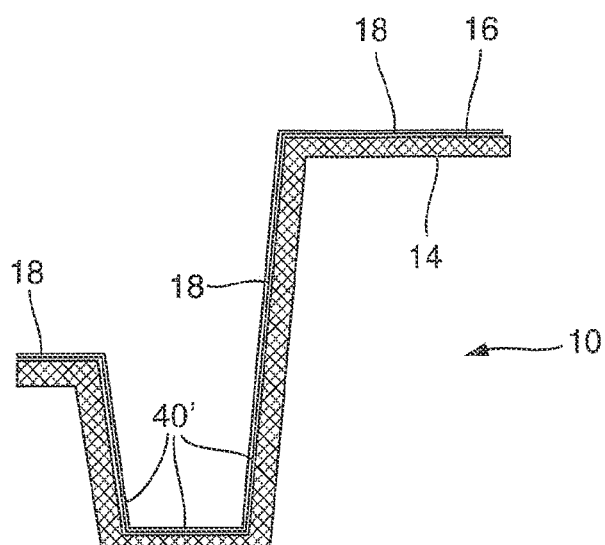
FIG. 5 is a sectional view of a workpiece provided for laser machining.

The workpiece 10 to be processed within the scope of the present invention is shown in section in FIG. 5 and comprises a substrate element 14 made from a transparent plastic with a surface 16, and a lacquer coating 18 applied to the surface 16. However, the substrate element 14 could also consist of a non-transparent plastic. In the context of the invention, the lacquer coating is supposed to be removed from the workpiece 10 in relatively large-area regions by laser machining. Damage to or impairment of the transparency of the substrate element 14 is in this case supposed to be prevented. In addition, the workpiece 10 has a relatively complex three-dimensional shape at least in the region of the surface 16 to be machined. A laser beam 20 generated and emitted by the laser unit 4 is applied to the workpiece 10 arranged in the machining position 12. The region of the laser beam 20 which impinges on the surface 16 provided with the lacquer coating 18 is called the machining point 22.

At the machining point 22, material of the lacquer coating 18 of the workpiece 10 is locally removed due to the heat generation caused by the energy of the laser beam 20. In particular, the lacquer coating 18 is suddenly heated at the machining point 22, so that the material of the lacquer coating 18 evaporates at the machining point 22. For increasing the absorption of the laser beam, the lacquer coating can be provided with an appropriate additive.

Figure 2:
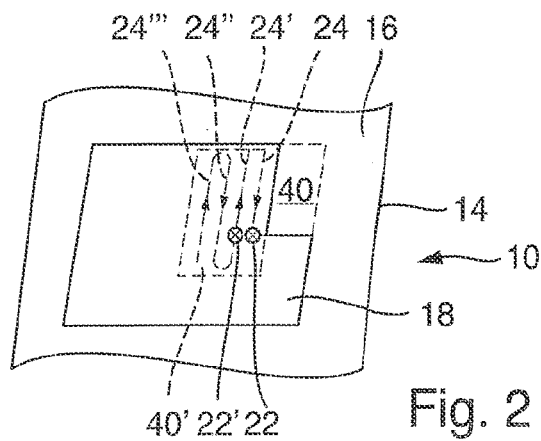
FIG. 2 is a schematic view of a workpiece arranged in the laser machining device from FIG. 1.

In order to remove material in a desired large-area region of the lacquer coating 18, the machining point 22 is moved along a work path 24 (cf. FIG. 2). The machining point 22 is moved in that a point of impingement of the laser beam 20 is moved onto the surface 16. For this purpose, the laser machining device 2 preferably comprises actuators 26, via which the laser unit 4 is aligned and/or moved. The laser unit is moved linearly in particular in the X-, Y-, or Z-direction. Alternatively or additionally, it is conceivable that the laser unit is rotated about one of said axes (X, Y, Z).

The actuators 26 are controlled by the control unit 6, which is indicated by the dashed line 28. The controlling can take place, for example, via one or more data lines (not depicted) or a radio link between the control unit 6 and the actuators 26. By controlling the actuators 26 with suitable control commands or signals from the control unit 6, the laser unit 4 is aligned and moved such that the laser beam 20 and thus also the machining point 22 are moved along the desired work path 24.

In this case, it is conceivable that both the entire laser unit 4 or only a part of the laser unit 4 is aligned and moved. If only a part of the laser unit 4 is moved, the laser unit comprises, for example, suitable deflectors (e.g., adjustable deflecting mirrors), so that the exit direction of the laser beam from the laser unit can be varied. The deflectors can be aligned and/or moved by the actuators 26. Moving and/or aligning the deflectors can in particular comprise a linear movement in the X-, Y-, or Z-direction. Alternatively or additionally, it is conceivable that the deflectors can be rotated about one of said axes (X, Y, Z).

Laser machining systems of the type described herein preferably have a displacement unit which has two or three degrees of translational freedom. However, the displacement unit can also have at least one rotational degree of freedom. In this case, the workpiece or parts of the system or both can move. Furthermore, the system may include deflectors for the laser beam, for example, a 2D scanning unit. An optical focusing unit is coupled to said scanning unit, which allows for an optical adjustment of the distance between the focusing unit and the workpiece. The displacement unit now carries out slow movements, while the scanning unit carries out fast movements.

The system brings the workpiece into a defined position. In this position, the regions lying in the work region of the scanning unit having the focusing unit are machined. Once this region has been machined, the workpiece is moved to a next position and machining is continued. During the change of positions, the laser is deactivated.

Alternatively, the displacement unit can perform a continuous or quasi-continuous movement along a one-dimensional line (straight line or curve), and the scanning unit moves the laser beam perpendicular to the movement generated by the displacement unit. In this case, the component is moved in one step by the width of a strip created by the laser. As a result, material along one strip is removed. The laser remains activated while the system is moving. Due to the 3D contour of the component, a 2D scanning unit is required to compensate for the geometric deviations that can occur by projecting the geometry onto the component.

In the course of the laser machining, the laser unit 4 is also controlled by the control unit 6, so that it emits a desired laser beam 20. In particular, the power, the pulse duration, and the pulse frequency of the laser beam 20 can be specified by suitable controlling. This controlling of the laser unit 4 by the control unit 6 is indicated in FIG. 1 by the dashed line 30. The connection between control unit 6 and laser unit 4 can be realized, for example, by one or more data lines (not depicted) or a radio link (not depicted).

For this purpose, control signals are transmitted to the actuators 26 and the laser unit 4 as part of the controlling of the actuators 26 and the laser unit 4 by the control unit 6. These signals are particularly dependent on values for operating parameters for operating the laser unit. The operating parameters comprise, for example, a position (X, Y, Z), an angle of rotation, a speed at which the machining point 22 is moved over the surface 16 along the work path 24, a pulse duration, a pulse frequency and/or a power of the laser unit.

The values for the operating parameters can be generated, for example, by the control unit 6 itself in that data from the workpiece 10 is transferred to the control unit and the control unit accesses a database in which operating parameters assigned to the data are stored. The data of the workpiece 10 that are transferred to the control unit 6 comprise, for example, information about the workpiece 10 to be machined (shape of the workpiece 10, for example, as data from a CAD model, material and/or thickness of the lacquer coating 18, material of the substrate element 14), information about the machining position 12 of the workpiece 10, and/or information about a region of the lacquer coating to be removed. The control unit 6 is connected, for example, to an operating unit (not depicted). Said data can be entered by a user via the operating unit. Alternatively or additionally, said data can be transferred to the control unit via an electronic memory interface.

Furthermore, the values for the operating parameters can be transferred to the control unit 6, for example, by loading values generated and stored prior to the actual laser machining. In one embodiment, a set of operating parameters can be generated for each workpiece 10 to be machined and transferred to the control unit 6. The operating parameters are generated, for example, by a computing unit, depending on data about the workpiece to be machined (shape of the workpiece 10, material and/or thickness of the lacquer coating 18, material of the substrate element 14, information about the machining position 12 of the workpiece 10, information about a region of the lacquer coating to be removed). It is also conceivable that the operating parameters are generated depending on expert knowledge and empirical values in the field of laser machining. The operating parameters are transferred, for example, via an operating unit or via an electronic memory interface.

According to the embodiment shown in FIG. 1, the laser machining device 2 comprises a sensor element 32. The sensor element 32 is designed, for example, to detect a position and/or an alignment of the workpiece 10 arranged in the work region 8. The sensor element 32 is, for example, a contact or touch sensor or a camera. A touch sensor could be arranged in the machining position 12 and detect the position and/or alignment of the workpiece 10 in the work region 8. A camera could, e.g., be arranged at a distance from and above the work region 8 and optically detect the workpiece 10. The position and/or alignment of the workpiece 10 can be determined by evaluating the camera signals. The sensor element 32 can then preferably be used to detect whether and how the workpiece 10 is arranged and aligned at the machining position 12. The sensor element 32 acquires data about the position and/or the alignment of the workpiece 10 and transmits said data to the control unit 6. The data transmission between sensor element 32 and control unit 6 is shown with a dashed line 34.

The control unit 6 comprises a computing unit 36 and a memory element 37 on which a computer program 38 is stored that can be executed on the computing unit 36. The laser unit 4 and the actuators 26 are controlled depending on the computer program 38.

FIG. 2 is a plan view of the surface 16 of the workpiece 10 to be machined. The lacquer coating 18 is applied to the surface 16. By way of example, the machining point 22 is shown, in which the laser beam 20 initially impinges on the workpiece 10 after the workpiece 10 has been arranged in the machining position 12. Furthermore, a region 40 is shown by way of example on the surface 16 of the workpiece 10, in which the lacquer coating 18 has already been removed. In addition, the lacquer coating 18 is supposed to be removed in a region 40' on the surface 16 of the workpiece 10. As already described, the machining point 22 is moved along the work path 24. In order to remove material of the lacquer coating 18 over a large region, the machining point 22 is moved along a plurality of adjacent work paths 24, 24', 24", 24'''. The work paths 24, 24', 24", 24''' are so close to one another that a machining point 22' of the laser beam 20 on a first work path 24' adjoins the machining point 22 of the laser beam on the adjacent work path 24 or partially overlaps said machining point. The work paths 24, 24', 24", 24''' are selected such that a desired region 40, 40' of the lacquer coating 18 is removed over a large region. The laser beam 20 is moved along the work paths 24, 24', 24", 24''' in that the values for the operating parameters for operating the laser unit and control signals for controlling the actuators are generated depending on the values of the operating parameters.

Figure 3:
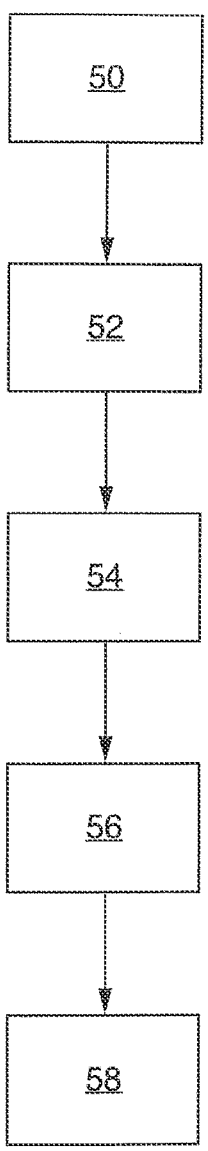
FIG. 3 shows a schematically depicted sequence of a method according to the invention.
Figure 4:
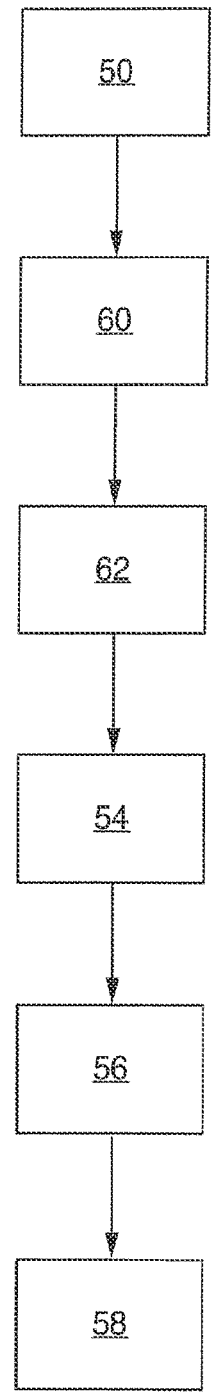
FIG. 4 shows a schematically depicted further sequence of the method according to the invention.

FIGS. 3 and 4 each schematically show a flow chart of the method according to the invention for the material-removing laser machining. According to FIG. 3, the workpiece 10 is arranged in a first step 50 at a machining position 12 in a machining region 8 of the laser unit 4. In a second step 52, values for operating parameters for operating the laser unit are generated.

In a third step 54, the laser unit 4 generates and emits a laser beam 20 depending on the values for the operating parameters generated in the second step 52. In a fourth step 56, the emitted laser beam 20 is applied at a machining point 22 to the workpiece 10 arranged at the machining position 12. This application causes a local material removal at the machining point 22. In a fifth step 58, the laser beam 20 and thus also the machining point 22 is moved along the work paths 24, 24', 24", and 24''' according to the generated values, so that a desired region 40' of the lacquer coating 18 is removed over a large region.

It must be noted hereto that in particular steps 54 to 58 can be carried out in chronological succession or at the same time. Furthermore, step 52, which comprises the generation of values for operating parameters for operating the laser unit, can be carried out prior to or at the same time as the first step 50 which comprises arranging the workpiece 10 at the machining position 12.

FIG. 4 shows an example of a sequence of the method according to the invention in which, after step 50, which comprises arranging the workpiece 10 in the machining position 12, the position and alignment of the workpiece 10 is detected in a step 60. Based on the detected position and alignment of the workpiece 10 by the sensor element 32, values for operating parameters for operating the laser unit and control signals for controlling the actuators are then generated in a step 62 depending on the values of the operating parameters. Subsequently, the aforementioned steps 54, 56, 58 are carried out.

FIG. 5 is a sectional view of an example of the workpiece 10 to be machined within the scope of the invention. The workpiece 10 comprises the substrate element 14 made from a transparent plastic with the surface 16, and the lacquer coating 18 applied to the surface 16. Regions 40' in which the lacquer coating 18 is supposed to be removed are shown by way of example. The complex three-dimensional structure of the workpiece 10 can be clearly seen in FIG. 5.

Figure 6:
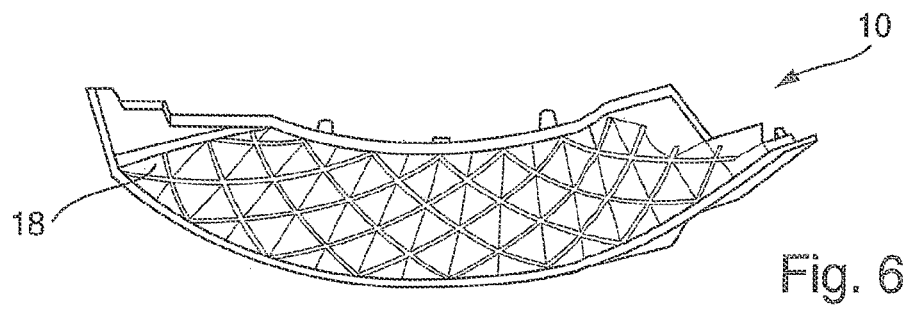
FIG. 6 is a plan view of a workpiece.
Figure 7:
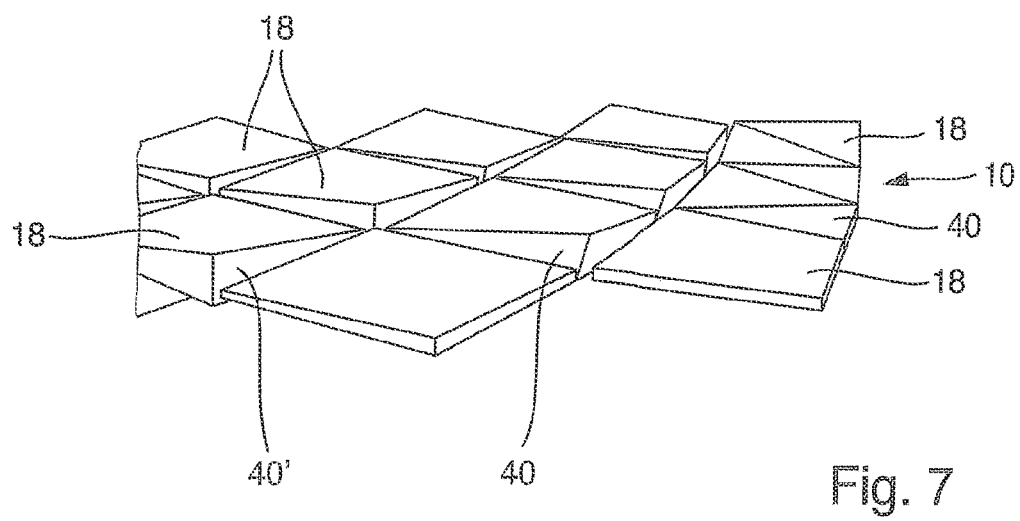
FIG. 7 is a view of a machined workpiece.

FIG. 6 shows another example of a workpiece 10 in its entirety. Here, too, the three-dimensional shape can be clearly seen. FIG. 7 shows a section of the workpiece 10 from FIG. 6, in which the lacquer coating 18 applied to the surface 16 of the workpiece has been removed in regions 40. The workpiece 10 in FIG. 7 is backlit by a light source. It can be clearly seen that regions of the surface 16, in which the lacquer coating 18 is still present, appear dark. In contrast, the regions 40 in which the lacquer coating 18 was removed over a large region by the method according to the invention appear shining brightly.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for producing an interior of a headlight lined with a decorative screen to be backlit by a laser machining device, wherein the method comprises the steps of:

removing material from the decorative screen by laser machining, wherein the decorative screen includes a substrate element made from a transparent plastic with a surface, and a lacquer coating applied to the surface prior to the laser machining, wherein the laser machining is carried out by the laser machining device which comprises a laser unit and a control unit that controls the laser unit;

arranging the decorative screen in a machining position in a work region of the laser unit, generating values for operating parameters for operating the laser unit, generating and emitting a laser beam by the laser unit according to the generated values for the operating parameters, applying the emitted laser beam to the transparent plastic substrate of the decorative screen arranged in the machining position at a machining point in a region of the surface of the decorative screen provided with the lacquer coating, so that material of the lacquer coating is removed locally at the machining point, providing electromagnetic actuators for moving the laser unit, the laser beam and thus also the machining point according to the generated values for the operating parameters by the laser unit relative to the decorative screen along a work path in the region of the surface of the decorative screen provided with the lacquer coating, so that material of the lacquer coating is removed along the work path, wherein the machining point is moved along a plurality of adjacent work paths, wherein adjacent work paths are so close to one another that a machining point of the laser beam on one work path adjoins or partially overlaps a machining point of the laser beam on an adjacent work path in order to remove material of the lacquer coating over a large region, and that the laser unit is moved according to the generated values for the operating parameters in order to change a position of the machining point and to follow a three-dimensional course of the surface provided with the lacquer coating when said laser unit moves along the work paths, wherein the values for the operating parameters for operating the laser unit are generated and the laser unit is moved in accordance with the generated values for the operating parameters such that an angle of the laser beam in the machining point relative to the surface of the decorative screen provided with the lacquer coating remains constant while the laser unit moves along the work paths.

2. The method as set forth in claim 1, wherein the electromagnetic actuators are controlled by the control unit.

3. The method as set forth in claim 1, wherein the values for the operating parameters of the laser unit are generated ad hoc immediately prior to or during the laser machining.

4. The method as set forth in claim 3, wherein the values for the operating parameters are generated depending on data of the decorative screen.

5. The method as set forth in claim 4, wherein the values for the operating parameters are generated depending on information about the three-dimensional shape of the decorative screen and/or about the machining position of the decorative screen and/or information about a region of the lacquer coating to be removed and/or about material and/or thickness of the lacquer coating and/or about material of the substrate element.

6. The method as set forth in claim 1, wherein the values for the operating parameters of the laser unit are generated immediately prior to or during the actual laser machining, wherein the generating of the values for the operating parameters comprises a loading of values generated prior to the laser machining.

7. The method as set forth in claim 1, wherein a position and/or alignment of the decorative screen is detected by a sensor element and values for the operating parameters are generated depending on the detected position and/or alignment.

8. The method as set forth in claim 1, wherein the laser unit is controlled depending on a program that can be executed on the control unit.

9. The method as set forth in claim 1, wherein the control unit comprises a computing unit and a computer program that can be executed on the computing unit.

10. The method as set forth in claim 9, wherein the control unit is designed to generate the values for the operating parameters of the laser unit.

11. The method as set forth in claim 9, wherein the laser machining device comprises electromagnetic actuators for positioning and/or aligning and/or moving the machining point of the laser beam and/or the laser unit.

12. The method as set forth in claim 9, wherein the laser machining device comprises at least one sensor element for detecting a position and/or alignment of the decorative screen in the machining position.

* * * * *